June 28, 1955 D. JACKSON 2,712,035
PORTABLE TELEVISION CAMERA
Filed Feb. 26, 1951 2 Sheets-Sheet 1
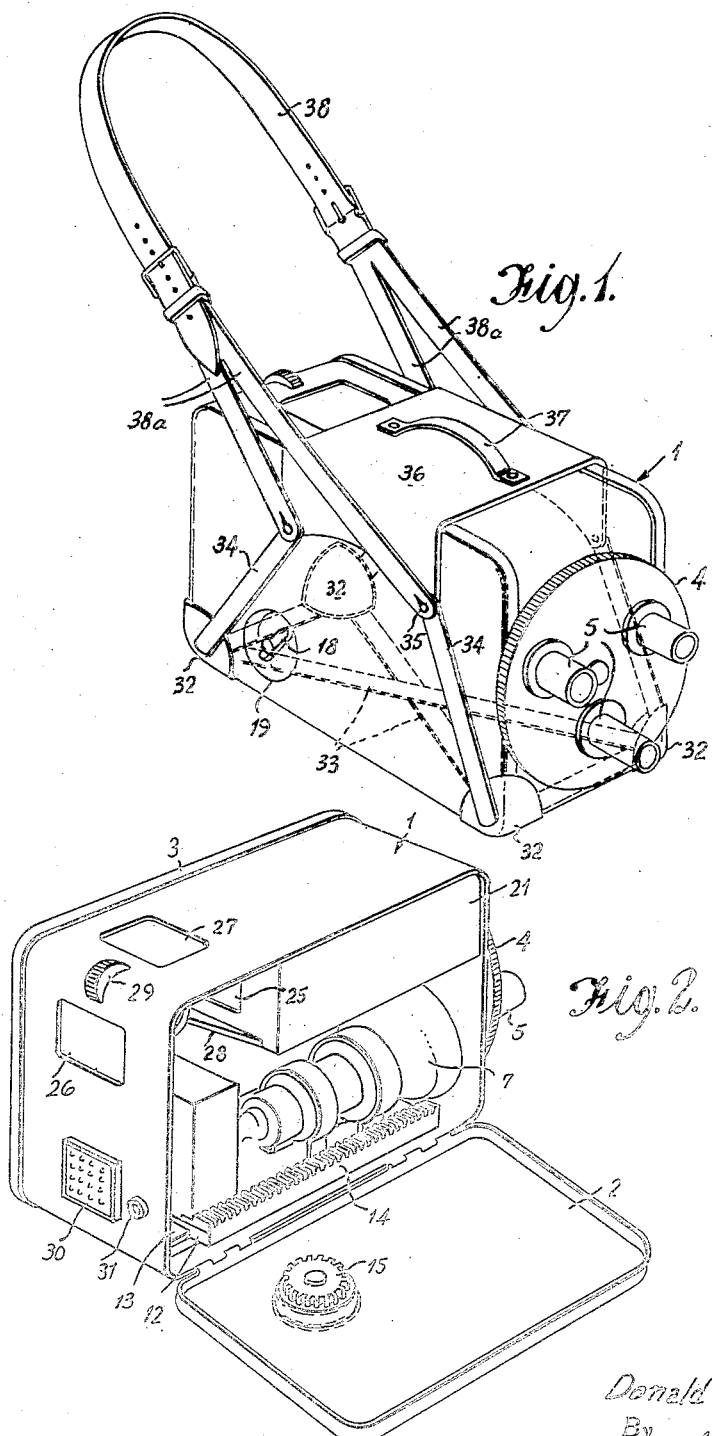
Inventor
Donald Jackson
By
Emery, Holensh & Blair
Attorney June 28, 1955  D. JACKSON  2,712,035
PORTABLE TELEVISION CAMERA
Filed Feb. 26, 1951  2 Sheets-Sheet 2

Inventor
Donald Jackson
By
Emery, Hohmuth & Blair
Attorney

2,712,035

PORTABLE TELEVISION CAMERA

Donald Jackson, Cambridge, England, assignor to Pye Limited, Cambridge, England, a British company Application February 26, 1951, Serial No. 212,813

Claims priority, application Great Britain March 2, 1950

3 Claims. (Cl. 178—6.8)

The present invention relates to television cameras and has for its object to provide a camera which is small and compact, and which can be easily carried by the operator or suspended on a strap around his neck. Such a camera is particularly suitable for outside broadcast work.

From one aspect according to the invention the camera comprises a box-like casing, conveniently of a size of about 10" long, 7" high and 5" wide, the front wall of which carries the lens, or a rotatable turret on which a plurality of lenses may be mounted, and both side walls of which are removable to permit access to the interior of the box for servicing the components therein. Preferably the side walls are hinged to the main body of the box, conveniently along their lower edges so that they may be swung outwardly and downwardly for servicing the camera.

From another aspect, the invention consists in a portable television camera comprising a box-like casing of which the front wall carries a lens, or a turret carrying a plurality of lenses, the pick-up tube being mounted within the box upon a carriage so as to be slidable longitudinally therein towards and away from the lens and wherein at least one of the side walls of the box is removable or hingedly connected to the box so that that side can be opened for inspection of the components within the camera, said side wall carrying a handle, knob or the like for effecting the longitudinal adjustment of the tube carriage, and means for automatically coupling the handle or the like to drive the tube carriage when the said side is replaced or closed. When the side is removed or opened, the drive is uncoupled so that the tube carriage can be easily removed for servicing. In one embodiment, the tube carriage is provided with a toothed rack along its upper surface which is so positioned that a pinion carried at the inner end of the handle shaft projecting through said side wall will automatically mesh with the rack when the side is closed. The tube carriage preferably also carries the head amplifier for the tube.

The focusing of the camera is controlled visually by the operator by means of a monitor cathode ray tube arranged within the camera, and which also serves as a view-finder. According to another novel feature of this invention, the camera box is provided with view-finder apertures both in its upper surface and in its back surface, whereby the operator can see the monitor cathode ray tube either when the camera is supported in front of his body or when it is raised directly in front of, or above, his eyes, when it is necessary to raise the camera in order to avoid obstructions.

According to this feature, the invention also consists in a portable television camera comprising a box-like casing carrying the lens or lens turret on its front surface and containing the television pick-up tube and a monitor cathode ray tube, wherein the casing is provided with two view-finder apertures arranged respectively adjacent the back of the top surface and the top of the back surface of the box, the monitor tube being arranged so as to be directly visible through one of said apertures, and there being disposed between said apertures a mirror which can be moved into the path between the monitor tube and the aperture through which it is directly visible so as to reflect the light from the monitor tube through the other aperture. Preferably the monitor tube is disposed horizontally so as to be visible through the viewing aperture in the back surface, the mirror being mounted so that it can be swung about a pivot point disposed between the two apertures from a position in which it is horizontal, when the monitor tube can be directly viewed through the aperture in the back surface, to a position in which it is inclined at 45° to the horizontal and reflects the light from the monitor tube through the aperture in the upper surface. Preferably the mirror is double-sided so that, when it is in its horizontal position, the monitor tube can still be seen when the camera is raised above the head by reflection from the underside of the mirror through the rear viewing aperture. The mirror may be operated by a knurled disc extending through the wall of the box between the two viewing apertures.

In order that the invention may be more clearly understood, reference will now be made to the accompanying drawings, in which:

Fig. 1 shows a perspective view of the camera from the front, in its carrying strap.

Fig. 2 shows a perspective view of the camera from the rear with one side wall open.

Figure 3:
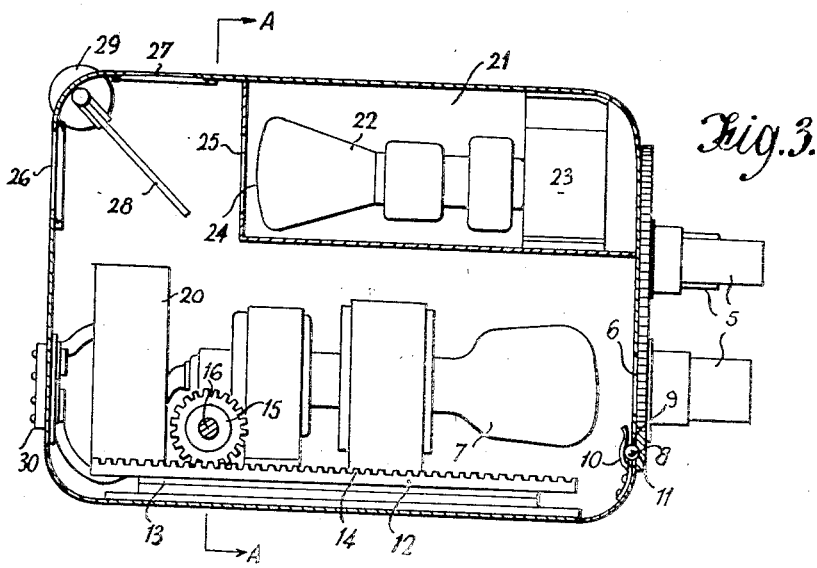
Fig. 3 shows a side elevation of the camera with the side wall removed.
Figure 4:
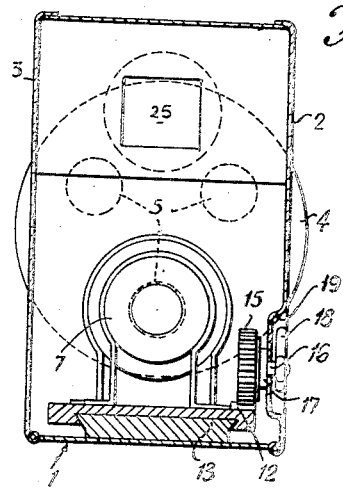
Fig. 4 shows a section through the camera along the line A—A in Fig. 3.

The camera comprises a metal box 1 about 10" long, 7" deep and 5" wide, having its two side walls 2, 3 hingedly connected thereto along their bottom edges so that they may be opened for servicing the components within the box. The front of the box carries a rotatable turret 4 carrying a number of lenses 5, any of which may be moved into alignment with an aperture 6 in the front wall of the box behind which is disposed a pick-up tube 7. The peripheral edge of the turret 4 is knurled and preferably extends beyond the side walls 2, 3 of the box to facilitate its movement, the turret 4 being located in the various positions in which the lenses 5 are correctly aligned, preferably by means of a spring-pressed member, for example by a ball or rounded projection 8 extending through an aperture 9 in the front wall of the box and urged forwardly by a leaf-spring 10 carried on the inner surface of the front wall, the ball or member being adapted to engage in indexing recesses 11 formed on the rear surface of the turret plate 4.

Within the box, the pick-up tube 7 is supported on a carriage 12 mounted for guided movement longitudinally of the box towards and away from the lens. This carriage 12 may be mounted for movement on a dove-tail slide 13 and carry a toothed rack 14 on its upper surface which is adapted to be engaged by a pinion 15 carried on the inner end of a shaft 16 extending through a bearing 17 in one of the side walls 2 and carrying a focus control handle 18 at its outer end, said handle 18 preferably being arranged in a recess 19 formed in the outer surface of the side wall 2. When this side wall 2 is hinged open the pinion 15 is disengaged from the rack 14; it automatically engages with the rack when the side wall is again closed.

Also supported by the carriage 12 is the head amplifier 20 for the pick-up tube 7, whereby the connections between the tube 7 and the head amplifier 20 may be of the correct length and will not vary in length as the tube is moved for focusing.

Figure 5A:
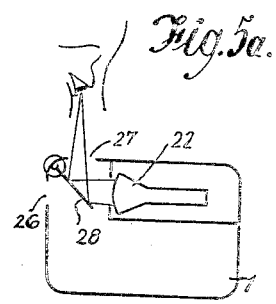
Figs. 5a, 5b, 5c show diagrammatically alternative methods of using the view finder.
Figure 5B:
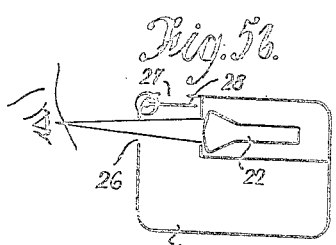
Figure 5C:
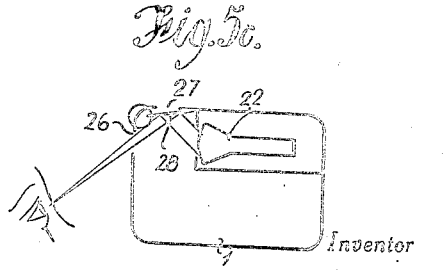

In the front top half of the camera is arranged a screened enclosure 21 containing a monitor cathode ray tube 22 and those parts of the time base, such as the final amplifier 23 of the time base, which must necessarily be located near the pick-up tube. The screen 24 of the monitor tube 22 is visible through an aperture 25 in the back wall of this enclosure 21 and is spaced from the back wall of the camera box. In the back wall of the camera box and in alignment with the monitor tube 22 is a viewing aperture 26, appropriately covered with a viewing lens. A similar viewing aperture 27 is formed in the top of the box above the space between the monitor tube and the back of the camera box. In the top back corner of the camera box is hingedly mounted a double-sided mirror 28 which can be rocked from a horizontal position to one at which it is inclined at approximately 45° to the horizontal and lies in front of the monitor tube so that the picture thereon will be reflected through the viewing aperture 27 in the top of the camera box as shown in Fig. 5a. In this position the operator can view the monitor tube when the camera is supported on the straps in front of his body. When the mirror is in its horizontal position, the monitor tube can be viewed through the rear viewing aperture 26, as shown in Fig. 5b, the camera then being held in front of the operator's eyes. By reason of the mirror being double-sided, the monitor tube can be viewed by reflection from the undersurface of the mirror when in its horizontal position, or preferably slightly upwardly inclined position, as shown in Fig. 5c, which enables the camera to be used when raised above the operator's head in order to clear obstructions. The mirror 28 may be actuated by a knurled disc 29 extending through the top back corner of the camera box 1.

The various leads from the apparatus within the camera terminate in a multi-contact socket 30 on the back of the camera box. A separate plug 31 may also be provided on the back of the box into which a microphone and/or telephone may be plugged for enabling the camera operator to talk back to the control room. The camera is connected to the other apparatus of the camera chain by plugging a complementary connector into the socket 30 at the back of the camera box.

The camera is adapted to fit within a carrying holder, preferably made of leather, which may be provided with a carrying handle and also a strap which is adapted to fit around the operator's neck and support the camera in front of the operator. This carrying holder may comprise four corner pieces 32, inter-connected by leather straps 33, adapted to fit and retain the four bottom corners of the camera, further straps 34 extending upwardly from each of these corner pieces 32 to connect, preferably by means of buttons 35, with a saddle portion 36 which extends over the top of the camera and is provided with a carrying handle 37. The neck strap 38 may be forked at its lower ends, thus forming four free ends 38a which are adapted to be connected to the buttons 35 on the saddle 36. The neck strap 38 may, of course, be made adjustable in length.

According to a further feature of the invention, the remaining apparatus of the camera chain and the control devices and instruments therefor are accommodated in a container, similar to a large suit-case, which also contains space for receiving the camera, when not in use, and the cable for connecting the camera to the equipment in the case, whereby the whole equipment may be transported in the form of a single suit-case. The case may be constructed with a central chassis, upon opposite sides of which the various components are mounted, and with the control knobs arranged on a panel at the top end of the chassis. Both sides of the case are preferably hinged so that they can be opened to service the equipment on both sides of the chassis, and separate removable or hinged portions may be provided at the top of the case, when it is standing vertically on the ground, in order to give access to the control knobs and instruments. The panel carrying the control knobs or instruments may be of inverted V-shape, with corner pieces of the case hinging backwards to expose the control knobs and instruments.

I claim:

1. A portable television camera comprising a box-like casing, a lens unit carried from the casing, a pick-up tube mounted within said casing, a first view-finding aperture arranged adjacent the back of the top surface of the casing, a second view-finding aperture arranged adjacent the top of the back surface of the casing, a monitor cathode-ray tube mounted within said casing so that an image thereon is directly visible through one of said apertures, a double-sided mirror disposed between said first and second apertures, means for moving the mirror to two positions so that in one position said mirror lies in the path between the monitor tube and the aperture through which the monitor tube is directly visible so that the image on the monitor tube can be reflected by one side of said mirror through the other of said apertures, and in the other position the mirror lies so that the image on the monitor cathode-ray tube can be reflected by the other side of said mirror through the aperture through which the monitor tube is also directly visible.

2. A portable television camera comprising a box-like casing, a turret carrying a plurality of lenses carried from the front wall of said casing, a pick-up tube mounted within said casing, a first view-finding aperture arranged adjacent the back of the top surface of the casing, a second view-finding aperture arranged adjacent the top of the back surface of the casing, a monitor cathode-ray tube disposed horizontally in the upper portion of said casing so that an image thereon is directly visible through the second of said apertures, a pivot disposed between said first and second apertures, a double-sided mirror mounted on said pivot, and means for swinging said mirror about said pivot from a horizontal position in which the image on the monitor tube can be viewed directly through the second of said apertures and said image is also reflected from one side of said mirror through said second aperture to a position in which said mirror is inclined at an angle 45° to the horizontal so that the other side of said mirror reflects the image from said monitor tube through the first of said apertures.

3. A portable television camera as claimed in claim 2, wherein the means for swinging the mirror about the pivot comprises a knurled disc extending through the top back corner of the camera casing.

References Cited in the file of this patent

UNITED STATES PATENTS

| 366,584 | Higgins | July 12, 1887 |
| 2,243,892 | Bedford | June 3, 1941 |
| 2,315,406 | Eddy | Mar. 30, 1943 |
| 2,355,136 | Bedford | Aug. 8, 1944 |
| 2,384,232 | Beers | Sept. 4, 1945 |
| 2,547,030 | Luckock | Apr. 3, 1951 |

FOREIGN PATENTS

| 518,090 | Great Britain | Feb. 16, 1940 |
| 570,384 | Germany | Feb. 15, 1933 |
| 878,804 | France | Nov. 2, 1942 |